US007967126B2

(12) United States Patent
Haddock

(10) Patent No.: US 7,967,126 B2
(45) Date of Patent: Jun. 28, 2011

(54) SELF-CENTERING LOADING, INDEXING, AND FLIPPING MECHANISM FOR COINAGE AND COIN ANALYSIS

(75) Inventor: Richard M. Haddock, Redwood City, CA (US)

(73) Assignee: Coinsecure, Inc., Palo Alto, CA (US)

( * ) Notice: Subject to any disclaimer, the term of this patent is extended or adjusted under 35 U.S.C. 154(b) by 102 days.

(21) Appl. No.: 12/426,870

(22) Filed: Apr. 20, 2009

(65) Prior Publication Data

US 2009/0286458 A1 Nov. 19, 2009

Related U.S. Application Data

(60) Provisional application No. 61/046,354, filed on Apr. 18, 2008.

(51) Int. Cl.
*B23Q 3/06* (2006.01)
*B25B 1/00* (2006.01)

(52) U.S. Cl. ............. 194/328; 194/293; 453/63; 269/57

(58) Field of Classification Search .................. 194/328, 194/330, 331, 293, 336, 337, 338, 352; 206/0.8, 206/0.81; 73/163; 453/63; 382/136; 434/110; 269/11, 57
See application file for complete search history.

(56) References Cited

U.S. PATENT DOCUMENTS 5,361,886 A * 11/1994 Thomas et al. ............... 194/317
6,761,257 B2 7/2004 Karlsson
2008/0128243 A1 6/2008 Wollny et al.

* cited by examiner

*Primary Examiner* — Stefanos Karmis
*Assistant Examiner* — Mark J Beauchaine
(74) *Attorney, Agent, or Firm* — Schneck & Schneck; David M. Schneck

(57) ABSTRACT

An apparatus to locate a coin comprises a rotary platform configured to hold the coin and a plurality of coin contacting mechanisms, coupled to the rotary platform.

10 Claims, 2 Drawing Sheets

SELF-CENTERING LOADING, INDEXING, AND FLIPPING MECHANISM FOR COINAGE AND COIN ANALYSIS

CROSS-REFERENCE TO RELATED APPLICATION

This application claims priority from provisional application Ser. No. 61/046,354, filed Apr. 18, 2008.

TECHNICAL FIELD

The present invention relates generally to coin collecting and valuation of coins, and more particularly, to an apparatus to align and center coins for an optical scattering signature apparatus.

BACKGROUND

The interest in the collection and conservation of coins and related objects has been historically considered a personal interest activity, with little formal standards or controls concerning the trading of coins. The recent rise in the value of coins compared to earlier levels has promoted the trading of coins to a higher degree of professional structure, most significantly by the advent of commercial third party coin grading services who have developed systems to apply a widely accepted quality grade (based on a numerical scale from 1 to 70 with 70 being the highest quality). After examining and determining the grade of a coin, the commercial services place the coin in a clear plastic holder in which a grade label with a reference barcode is affixed. The clear plastic holder is then ultrasonically welded around the coin, thus permanently linking the grade to the coin within the case. A barcode is linked to the database which can be searched to confirm that the referenced coin was graded by the commercial service, along with some additional transaction details such as the date, place, person grading the coin, etc.

The grading service charges a fee for the provided services and gives a warranty of grading accuracy as part of the transaction value. The result of this commercial service is to allow the plastic encapsulated coins to be more readily traded as their trade value is directly linked to the professional quality grade on the plastic holder.

However, the current commercial grading services lack repeatability and consistency. Further, contemporary services are unable to prevent "grader shopping" in which a coin owner may specifically hunt for the highest value for a given coin since there is currently not common database or rigorous objective means for identifying a specific coin.

To develop an automated coin grading system, a number of features are required or useful. One contemplated system provides capture of an optical signature from the coin, a unique set of optical properties that are repeatable in detection and specific to an individual coin. Such a system could also capture a digital image of the coin. One useful mechanism for such a system would be a mechanism to center the coin on a viewing platform.

SUMMARY

In various exemplary embodiments, an apparatus for locating a coin on a platform is disclosed. The apparatus comprises a rotary platform configured to hold the coin and a plurality of mechanisms coupled to the rotary platform. Each of the plurality of mechanisms has a means to act in concert to center the coin.

BRIEF DESCRIPTION OF THE DRAWINGS

The appended drawings illustrate exemplary embodiments of the present invention and must not be considered as limiting its scope.

DETAILED DESCRIPTION

Analysis of coins requires highly uniform and repeatable spatial positional control in order to accurately map key physical coin characteristics such as surface defects, variations in color, embossed feature height, and other measurable parameters. Mapping key physical characteristics may be accomplished by, for example, light scattering measurements from surface and edge measurements of the coin.

In general, accurate and precise measurements use a reproducible point of origin as a starting reference position for any measurement. The reproducible point of origin simplifies designing any type of analysis in which repeatable measurements are made. The reproducible point of origin further allows accurate and precise measurements to be made from the physical origin point. Such measurements may be expressed in a number of ways. For example, measurements taken from polar coordinate systems ($r$, $\theta$, $\phi$), cylindrical coordinate systems ($\rho$, $\theta$, $\phi$), Cartesian coordinate systems ($x$, $y$, $z$), or any other system typically presumes an origin point from which to work. Transformations between various coordinate systems are well-known to one of skill in the art.

Example I

Figure 1:
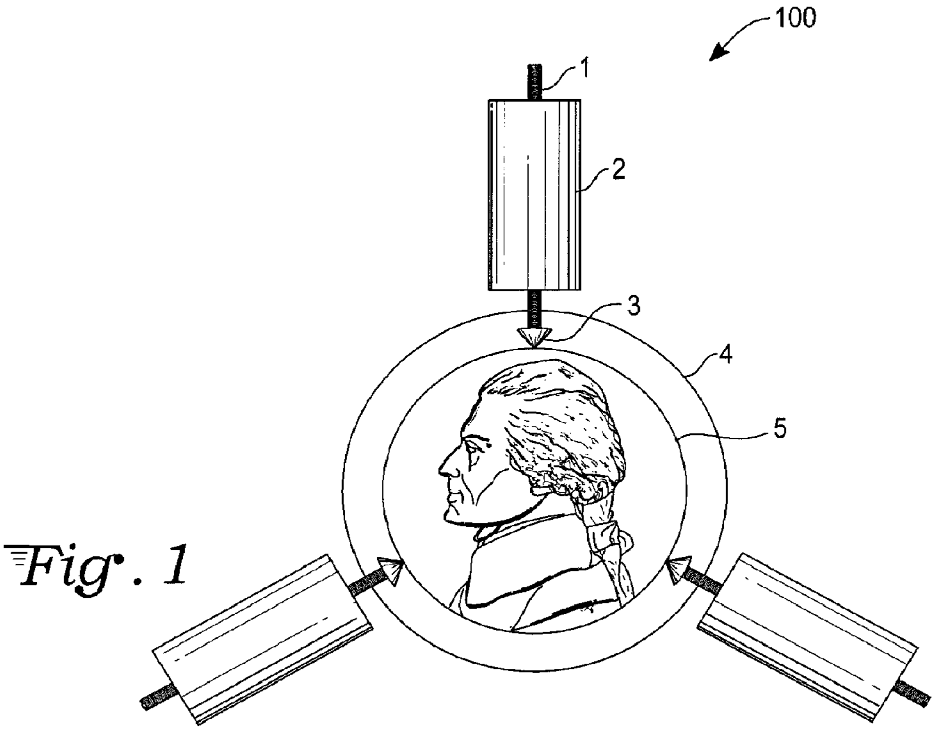
FIG. 1 is a plan view of an exemplary embodiment of an apparatus to precisely locate a coin under inspection.

An apparatus to facilitate rapid high precision placement and registration of origin placement of coins for image analysis is disclosed herein. With reference to FIG. 1, an exemplary embodiment of a coin centering system 100 provides alignment and placement of a sample coin 5 to within 50 microns or less. The exemplary coin centering system 100 specifically allows planar location of an origin. However, a person of skill in the art could apply the same techniques described herein to allow placement of the sample coin 5 anywhere within a spherical coordinate location (i.e., within a three-dimensional space) as well.

The coin centering system 100 includes a screw-drive linear positioning rod 1, a linear positioning stepper motor 2, an alignment tip 3, and a rotary stage 4. The linear positioning stepper motor 2 may be replaced by a servo motor with encoder control or another linear drive mechanism.

A skilled artisan will recognize that other linear positioning systems, such as piezoelectric linear transducers (e.g., piezoelectric motors, piezoelectric crystals, etc.), may either be used in conjunction with or substituted for the linear positioning devices described above.

The linear positioning system (consisting of the screw-drive linear positioning rod 1, linear positioning stepper motor 2, and the alignment tip 3) thus aligns the sample coin 5 in an x-y manner upon the rotary stage 4.

The alignment tip 3 is fabricated from a non-marring material machined from a variety of materials including Vespel®, Celcon®, Delrin®, Teflon®, Torlon®, or Arlon® plastics, or other materials such as fluropolymers, polytetrafluoroethylenes, and polyetheretherketones (PEEK). The alignment tip 3 will generally be only minimally deformable in ordinary use to avoid inaccurate placement of the sample coin 5.

The rotary stage 4 works in conjunction with the linear positioning system, described above, and provides a ϕ-rotational coordinate to precisely and accurately align the sample coin 5. The rotary stage 4 is designed based upon the largest coin size expected. In a specific exemplary embodiment, the rotary stage 4 may be approximately 50 mm or less in diameter. The rotary stage 4 may contain or be used in conjunction with a coin handling and flipping sub-system (not shown).

The rotary stage 4 and the linear positioning system are controlled by a set of control electronics which may be used to position a given point on the sample coin 5 manually (by using, for example, a joy-stick to control movement) or automatically (through, for example, an optical alignment system). Implementation of the control electronics and the optical alignment system is known in the art.

In another exemplary embodiment (not shown), the rotary stage 4 is positioned by the linear positioning system described above rather than positioning the sample coin 5 on the rotary stage 4 directly. In other embodiments (not shown) a coarse linear positioning system may be used to align the rotary stage 4 while a fine linear positioning system may be used to align the sample coin 5. Such a two-stage alignment system may employ a linear positioning stepper motor and a screw-drive positioning rod for coarse alignment of the rotary stage 4 and a piezo-positioning system for directly positioning the sample coin 5.

Example II

Figure 2:
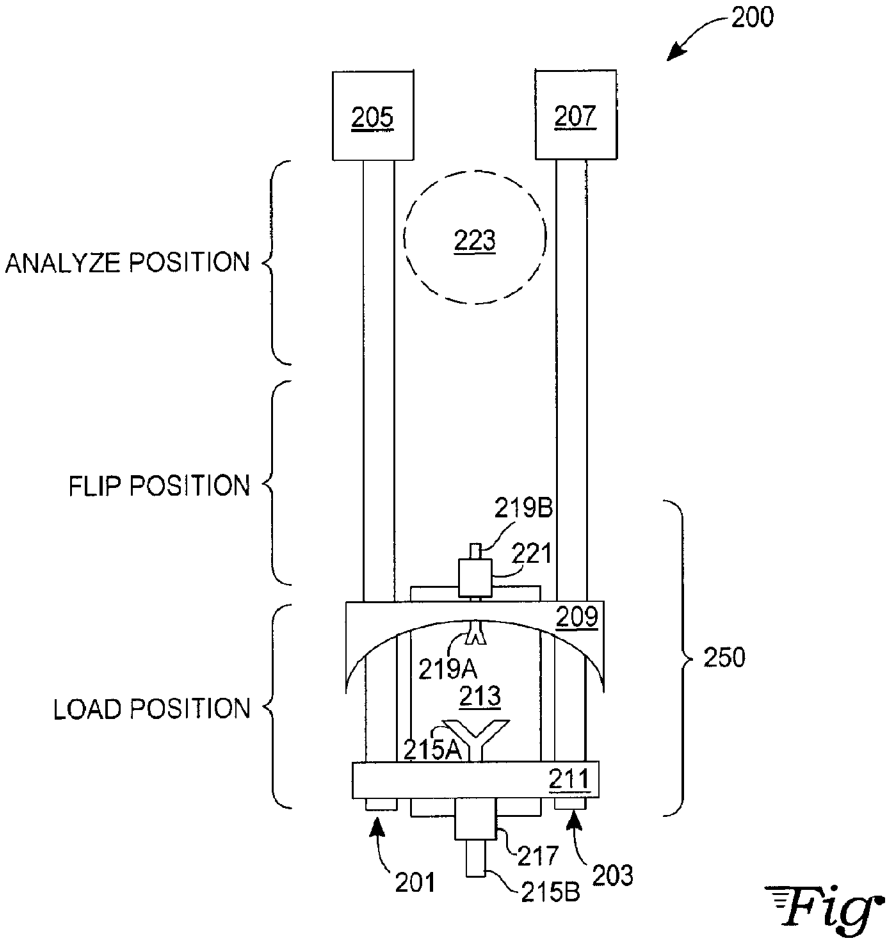
FIG. 2 is a plan view of an exemplary embodiment of an apparatus to precisely locate and flip a coin under inspection.

With reference now to FIG. 2, an exemplary coin loading and flipping mechanism 200 includes a lead screw 201 and a lead rail 203. A drive motor 205 is configured to turn the lead screw 201 upon which a coin holder mechanism 250 is attached. The drive motor 205 may be a stepper motor, a servo motor with an encoder, or various other types of positional devices known in the art that are capable of precise control. As the lead screw 201 is rotated, the coin holder mechanism 250 is driven between various positions described in detail, below.

The coin holder mechanism 250 includes a front support rail 209, a rear support rail 211, and a fixed coin positioning platform 213. The front support rail has a front coin positioning fork 219A that terminates on the distal end in a front fork lead screw 219B. A front fork drive motor 221 is configured to drive the front coin positioning fork 219A in a direction parallel to the lead screw 201. Similarly, the rear support rail 211 has a rear coin positioning fork 215A having an optional rear fork lead screw 215B coupled to an optional rear fork drive motor 217. Both the front 221 and the optional rear 217 drive motors may be stepper or similar motor types.

In one embodiment describing a typical coin loading operation in the "Load Position," the front 209 and rear 211 support rails are arranged to provide relative motion, one to another. As either the front 209 and/or rear 211 support rail is moved, a coin (not shown) placed on the fixed coin positioning platform 213 is contacted by the front 219A and the rear 215A coin positioning forks and is automatically centered between the lead screw 201 and the lead rail 203 due to the shape of the forks. In a specific exemplary embodiment, the rear support rail 211 is positioned by an optional drive motor 207. The optional drive motor 207 is configured to drive rear support rail 211 through the lead rail 203 independently of either the front support rail 209 or the coin holder mechanism 250. As will immediately be apparent to a skilled artisan, the locations shown for both the drive motor 205 and the optional drive motor 207 are merely chosen for convenience and may be readily located in other areas on the exemplary coin loading and flipping mechanism 200.

In another embodiment describing a typical coin loading operation in the "Load Position," the front 209 and the rear 211 support rails are fixed, relative to one another. As a coin (not shown) is placed on the fixed coin positioning platform 213, either the front 219A and/or the rear 215A coin positioning forks are driven by their respective motors 221, 217. The coin is again automatically centered between the lead screw 201 and the lead rail 203 due to the shape of the forks.

In a typical operation, after a coin (not shown) is loaded, the coin holder mechanism 250 moves from the "Load Position" to the "Analyze Position," thus placing the coin within the light scattering apparatus (not shown but described above). Appropriate measurements are taken of a front side of the coin.

In an exemplary embodiment, once the coin is in the "Analyze Position," an optional rotatable coin holder platform 223 (not shown directly but readily envisioned by a skilled artisan) may be raised to hold and rotate the coin. The coin is already centered in one direction by use of the front 219A and the rear 215A coin positioning forks between the lead screw 201 and the lead rail 203. The coin can readily be centered in the orthogonal position by simple positioning the coin holder mechanism 250 to stop in a precise position through judicious application of the drive motor 205. In this embodiment, the coin centering mechanism 100 of FIG. 1 is unnecessary.

In other exemplary embodiments, the optional rotatable coin holder platform 223 is not used. The coin remains in the coin holder mechanism 250 and is rotated by, for example, small pressure rollers and a motor driven capstan (not shown but readily understandable to a skilled artisan) mounted within the coin holder mechanism 250. The motor for driving the capstan may be a stepper motor. In a specific exemplary embodiment, the small pressure rollers and the motor driven capstan are built into the front 219A and the rear 215A coin positioning forks.

After measurements are taken of the front side of the coin, the coin holder mechanism 250 moves from the "Analyze Position" to the "Flip Position." Once at the "Flip Position," the coin is flipped so the obverse side of the coin may be readied for subsequent measurements.

In an exemplary embodiment, the coin is flipped by the front coin positioning fork 219A being driven by the front drive fork motor 221. In this embodiment, a small release pin (not shown) allows both the front 219A and the rear 215A coin positioning forks to rotate rather than be driven toward or away from the coin. Such a release pin may be readily actuated by a simple electronic controller (not shown). If the optional rear fork drive motor 217 is employed, both motors 217, 221 may be driven in unison. If the optional rear fork drive motor 217 is not present, a simple positioning gear drive or bearing block (neither of which is shown) may be substituted for the optional rear fork drive motor 217.

Once flipped, the coin may be moved from "Flip Position" back to the "Analyze Position" for measurements of the obverse side of the coin. After measurements are completed, the coin is moved from the "Analyze Position" to the "Load Position" to be replaced by another coin for measurement.

Example III

Figure 4:
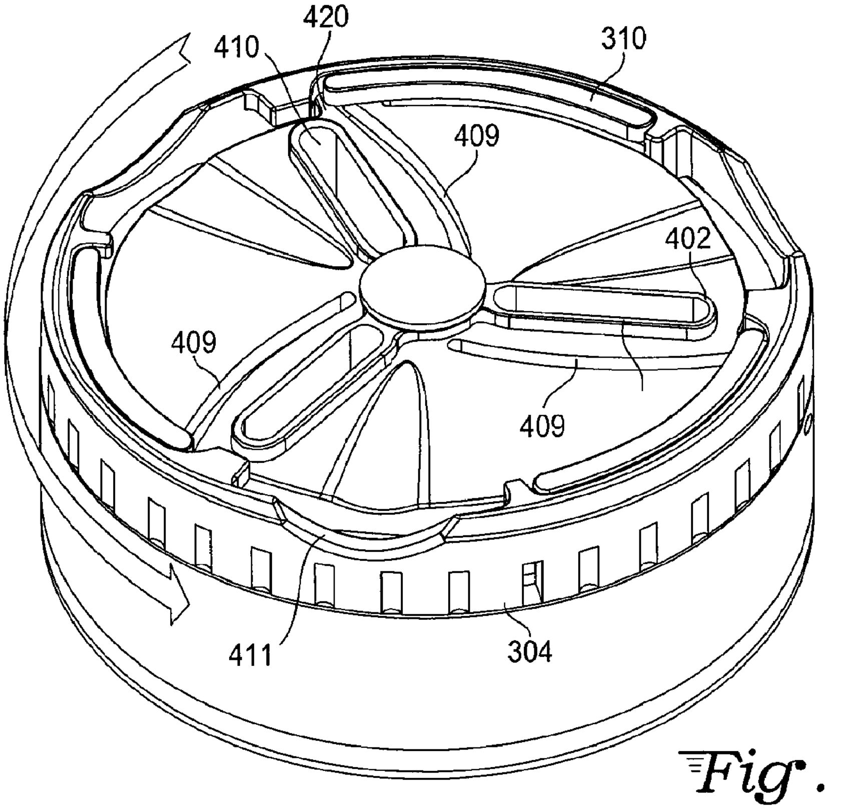
FIG. 4 is a perspective view of the turntable of FIG. 3 with the centering fingers retracted.

With reference to FIG. 4, a turntable for holding a coin includes a light pipe channel 410. When a coin (not shown) is placed onto the turntable, the coin will extend over the raised rims of the light pipe channel. When the laser light is directed onto the coin surface, light will not reach the light pipe until the laser has crossed the edge of the coin. As shown, three light pipe channels 410 are positioned on the turntable. If the coin is not centered the optical head can still target an edge of the coin. As the coin is rotated, the optical head is moved until light is detected in one of the light pipes. The turntable is then further rotated, and if no light is detected in the next light pipe then the coin is off center. The optical head can then continue to be moved as the coin is rotated, and the position of the edge of the coin determined by sensing when light is detected in the light pipes. The optical head can then be moved as scattering is detected to target the edge of the coin.

Figure 3:
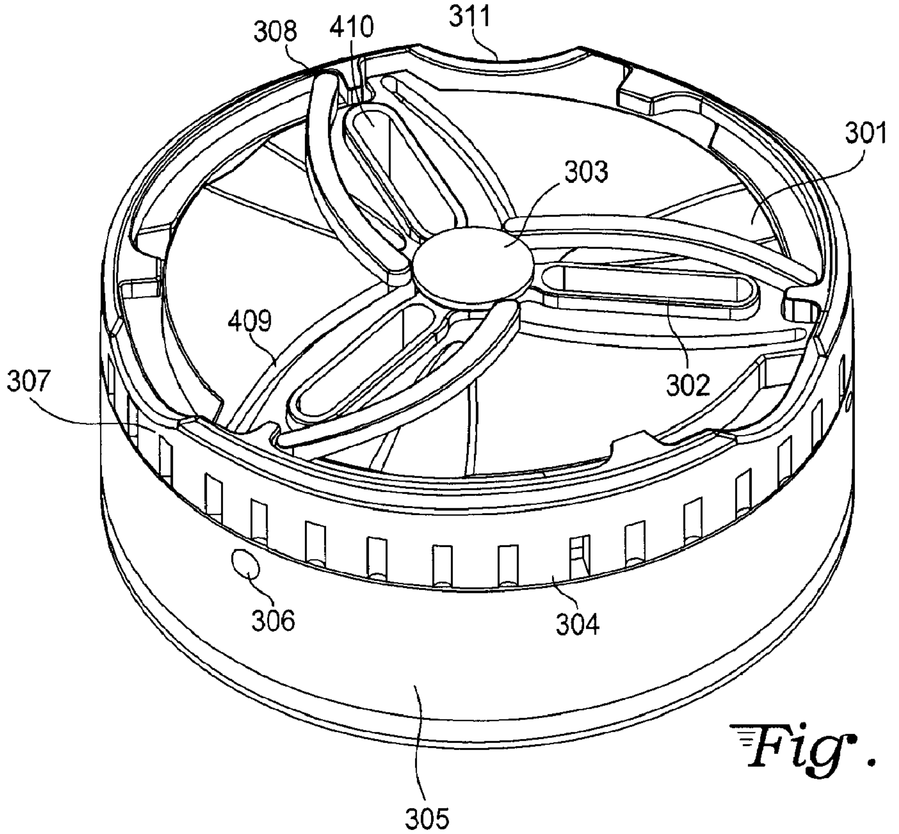
FIG. 3 is a perspective view of a coin holding turntable having a centering mechanism.

FIG. 4 also shows a coin centering finger 310 having a pin 420 that moves in track 409. As with the light pipe channels, three tracks allow three fingers to be mounted on the turntable. The second end of finger 310 is secured such that it pivots in place. As shown in FIG. 4, the fingers can retract to the edge of the turntable. With reference to FIG. 3, when the turntable is rotated by rotating ring 304 while turntable base 305 remains stationary, the fingers 301 will move along tracks 409. The tips of the fingers 301 will press against the coin, centering the coin on the platform. Finger grips 311 allow placement and removal of the coin, while fluted edge 307 allow gripping of the ring to pivot the centering fingers 301 at pivot point 308. The coin rests on the raised rim 302 on the light pipe channel 410. The light pipes terminate at light pipe channel hole 306. When this light pipe aligns with a detector. This device may be operated manually, or may be automatically actuated.

The turn table includes finger grips 311 which allow for rotation of the turntable. The coin is positioned on the center coin support platform 303 and rests against the edge of raised rims of the light pipe channel.

When a beam of light (e.g. laser light) is directed from above and the platform is rotated, the light will only pass into the light pipe channels after the light beam has crossed an edge of the object. By rotating the object and directing the light from above, the centering of the object can be confirmed by optical detection.

The present invention is described above with reference to specific embodiments thereof. It will, however, be evident to a skilled artisan that various modifications and changes can be made thereto without departing from the broader spirit and scope of the present invention as set forth in the appended claims.

For example, particular embodiments describe a coin positioning system employing linear positioning systems. A skilled artisan will recognize that other types of positioning systems may be employed as well. For example, two or more rotational devices with eccentric cams may be used to position the coin by contact with edges of the coin, thus driving the coin to a specific location. Additionally, although three linear positioning locators are shown, a skilled artisan will recognize that a similar system is readily envisioned requiring only two (i.e., x-y placement) linear positioning devices. The two-linear-device system may be coupled with spring load devices positioned opposite the linear positioning devices.

Moreover, the flipping mechanism 200 describes certain combinations of attached and optional motors driving various components. A skilled artisan will recognize that roles of the attached and optional motors may be readily reversed and have a similar effect.

These and various other embodiments are all within a scope of the present invention. The specification and drawings are, accordingly, to be regarded in an illustrative rather than a restrictive sense.

What is claimed is:

1. An apparatus for locating a coin, the apparatus comprising:

a rotary platform configured to hold the coin;

a plurality of means for contacting an edge of the coin and exerting a centering pressure on the coin; and a plurality of light pipe channels on said rotary platform, each light pipe channel leading to a light pipe configured to pass light to an edge of the rotary platform.

2. The apparatus of claim 1, further including a plurality of finger access cut outs on the rotary platform.

3. The apparatus of claim 1, further including a finger position control ring on the rotary platform.

4. The apparatus of claim 1, wherein the means for contacting the edge of the coin includes three coin centering fingers mounted on tracks on the platform, wherein each finger has a first pivoting end and a second track traveling end, the track traveling end configured to contact and center a coin.

5. An apparatus for locating a coin, the apparatus comprising:

a rotary platform configured to hold the coin;

a plurality of means for contacting an edge of the coin and exerting a centering pressure on the coin; and a plurality of light pipe channels on said rotary platform, each light pipe channel leading to a light pipe configured to pass light to an edge of the rotary platform;

wherein said light pipe channel includes a raised rim on which a coin may rest.

6. An device for locating a coin comprising:

a turntable base;

a rotating platform mounted on the turntable base;

a plurality of light pipe channels extending to a top surface of the rotating platform;

a plurality of light pipes positioned in the light pipe channels;

a coin support centered on the rotating platform; and at least three fingers configured to provide centering pressure to side edges of the coin.

7. The device of claim 6, wherein the fingers are curved and are attached to the rotating platform such that rotation of the platform extend the fingers towards a center of the platform.

8. The device of claim 6, wherein the fingers are curved and the fingers can retract to side edges of the rotating platform.

9. The device of claim 6, wherein said light pipes are each configured to transmit light to edge locations on the turntable base.

10. The device of claim 6, further including a plurality of finger access cut outs on said rotating platform.

* * * * *